Patented May 20, 1952

2,597,156

UNITED STATES PATENT OFFICE 2,597,156

TREATMENT OF CELLULOSE ESTERS

Mervin E. Martin and Laurence G. Reed, Cumberland, Md., assignors to Celanese Corporation of America, a corporation of Delaware No Drawing. Application January 22, 1949, Serial No. 72,271

10 Claims. (Cl. 260—230)

1

This invention relates to the treatment of organic acid esters of cellulose and relates more particularly to an improved process for the stabilization of ripened organic acid esters of cellulose.

An object of this invention is the provision of an improved process for the treatment of ripened organic acid esters of cellulose by heating said cellulose esters in aqueous media under conditions of elevated temperature and pressure to improve the stability of said esters.

Another object of this invention is to provide a process for the treatment of ripened organic acid esters of cellulose whereby the combined sulphates therein are substantially reduced and the molding qualities of said cellulose esters considerably improved.

A further object of this invention is the provision of a process for stabilizing organic acid esters of cellulose which eliminates or greatly reduces the tendency of said cellulose esters to discolor, decompose and/or degrade on being heated, as during molding operations.

Other objects of this invention will appear from the following detailed description.

In the process for preparing organic acid esters of cellulose, the esterification reaction is usually carried out by treating cellulose, with or without an initial pretreatment to render the cellulose more reactive, with an esterification medium comprising a lower aliphatic acid anhydride, an esterification catalyst such as sulfuric acid, and, usually, a lower aliphatic acid which is a solvent for the cellulose ester being formed. The fully esterified cellulose tri-ester produced is obtained in the form of a viscous, homogeneous solution. Water is then added to this primary cellulose ester solution in an amount sufficient to convert any aliphatic acid anhydride remaining to the corresponding aliphatic acid. The primary cellulose ester in solution, usually after the addition of a further quantity of water for ripening, is then permitted to ripen or hydrolyze after some or all of the sulfuric acid catalyst has been neutralized. During ripening, the cellulose tri-ester initially formed is hydrolyzed to a secondary cellulose ester having a lower degree of acylation and possessing the desired solubility characteristics. Ripening not only removes some of the acyl groups but, in addition, removes combined sulfuric acid. Water and/or other non-solvent for the cellulose acetate is then added in an amount sufficient to precipitate the ripened cellulose ester from solution and the precipitated cellulose ester is then washed with water to re-

2 move as much acid or other non-cellulose ester materials as possible. Despite the ripening treatment and washing, the cellulose esters obtained usually still contain an appreciable quantity of impurities which result in color formation and, often, in substantial reduction in viscosity when the cellulose esters are subjected to elevated temperatures, as during molding operations.

We have now found that ripened organic acid esters of cellulose may be satisfactorily stabilized to yield cellulose esters highly resistant to changes in viscosity and color when exposed to elevated temperatures, if the cellulose esters are subjected to a two-stage stabilization treatment. In accordance with our novel process, the initial stage of said stabilization comprises heating the cellulose ester in water under superatmospheric pressure, followed by a second stage of treatment comprising again heating the cellulose ester in an aqueous solution of a lower aliphatic alcohol under superatmospheric pressure. The stabilized cellulose esters produced by this two-stage stabilization treatment are found to have a materially lesser tendency to discolor, degrade, and/or decompose when heated than cellulose esters stabilized by merely heating them in water or in a dilute aqueous solution of an inorganic acid. Accordingly, our improved cellulose esters may be satisfactorily employed in the formation of molded articles wherein the cellulose esters are heated to a relatively high temperature for appreciable periods of time to impart the desired degree of plasticity thereto and to effect the desired molding operation.

While the novel process of our invention is applicable to the treatment of various organic acid esters of cellulose to effect a stabilization of the same, such as cellulose acetate, cellulose propionate, cellulose butyrate, cellulose acetate-propionate and cellulose acetate-butyrate, it will be more particularly described in connection with the stabilization of cellulose propionate which is a relatively hydrophobic cellulose ester that is not readily wetted by water and in connection with which, accordingly, the problem of satisfactory stabilization is more acute.

Thus, in accordance with our novel process, one part by weight of ripened cellulose propionate is suspended in about 10 to 16 parts by weight of water which is preferably of low alkalinity, and the mixture subjected to autogenous pressure of 40 to 75 pounds per square inch gauge by heating for ½ to 2 hours with steam. The steam may be circulated through the jacket of the autoclave, injected directly into the charge or the latter may be heated by a combination of both steps. The temperature obtained is, of course, that corresponding to the pressure. The pressure is released through the bottom of the reaction vessel to remove the liquid from the fibers and then the cellulose propionate fibers are suspended in 10 to 16 parts by weight of a 20 to 55% by weight aqueous solution of a lower aliphatic alcohol. The mixture of cellulose propionate and aqueous alcohol is then subjected to a pressure of 10 to 60 pounds per square inch gauge by heating with steam for ½ to 2 hours, the steam circulating through the jacket of the autoclave. At the completion of this treatment, the aqueous alcohol is removed, the cellulose propionate washed neutral and dried. A very satisfactorily stabilized cellulose propionate is thus obtained which may be molded at 200° C., with or without a suitable plasticizer, to yield molded articles of excellent color and with a relatively low loss in viscosity.

As examples of lower aliphatic alcohols which may be employed in accordance with the novel process of our invention, there may be mentioned ethyl alcohol, methyl alcohol, propyl alcohol, iso-propyl alcohol, butyl alcohol, iso-butyl alcohol, secondary butyl alcohol and amyl alcohol.

We have found, furthermore, that if the aqueous alcoholic stabilizing medium is removed from the stabilized cellulose ester by distillation an even greater improvement in color development is achieved. Preferably, when removing the alcohol by distillation, water is added to the suspension of cellulose ester in the aqueous alcoholic medium during said distillation at a rate approximately equal to the rate at which the alcohol is being distilled off so that when all of the alcohol has been removed, a suspension of the stabilized cellulose ester in water is obtained.

The advantage in removing the alcohol by distillation resides in the fact that the stabilized cellulose esters obtained exhibit even less color formation on being molded than when the aqueous alcoholic stabilizing medium is merely drained from the stabilized cellulose ester and the latter then washed neutral. The water employed in carrying out our novel stabilization process is preferably de-ionized water containing less than about 5 parts per million alkalinity.

In order further to illustrate our invention, but without being limited thereto, the following examples are given:

*Example I*

100 parts by weight of washed cellulose propionate containing about 64% by weight of combined propionic acid, 0.2% of combined acetic acid and 0.28 free hydroxyl groups per glucose residue are suspended in 1400 parts by weight of de-ionized water containing 3 parts per million alkalinity and subjected to a pressure of 70 pounds per square inch gauge for one hour by heating in an autoclave with steam.

The pressure is released, the water drained off and the cellulose propionate is then heated in the autoclave with steam for one hour at 20 pounds per square inch gauge pressure with 1220 parts by weight of a 44% by weight aqueous solution of ethanol. At the end of the stabilization treatment, the aqueous alcohol is released through a valve at the base of the autoclave and the cellulose propionate washed neutral to bromothymol blue with de-ionized water. When the stabilized cellulose propionate is molded into discs for 15 minutes at 200° C. with 15 parts by weight of dibutyl sebacate as plasticizer for each 100 parts by weight of stabilized propionate, the discs obtained have a yellowness coefficient of 0.23. When the stabilized cellulose proprionate is molded into discs for 30 minutes at 200° C. without any plasticizer, the viscosity loss in the discs is found to be 24%.

If the cellulose propionate is stabilized by merely heating in the presence of water for one hour at 70 pounds per square inch gauge with steam without a subsequent stabilization with aqueous ethyl alcohol and the cellulose propionate is molded into discs at 200° C. for 15 minutes with the same proportion of dibutyl sebacate as plasticizer, the molded discs obtained have a yellowness coefficient of 0.26. A viscosity loss of 63% is observed when the cellulose propionate is molded at 200° C. for 30 minutes without any plasticizer.

The numerical expression of color development, i. e. the yellowness coefficient, is obtained by measuring the percent light transmission of the disc at 640 m$\mu$ minus that at 440 m$\mu$ divided by the light transmission at 640 m$\mu$. The greater this coefficient the greater the degree of color.

*Example II*

Cellulose propionate is stabilized in the manner described in Example I, the initial stabilization being effected with de-ionized water and the second stabilization treatment with 44% by weight aqueous ethanol, the same conditions of time, temperature and pressure being employed.

At the completion of the stabilization, the pressure in the autoclave employed is released at the top through a condenser and, when atmospheric pressure is reached in the autoclave, the ethanol is continuously distilled from the cellulose propionate in suspension. During the distillation de-ionized water is added to the autoclave in a volume and at a rate equivalent to that at which the distillate is collected, in order to maintain the same level of liquid in the autoclave.

After distillation of the alcohol, the stabilized cellulose propionate is removed from the autoclave, washed neutral to bromothymol blue and dried. When the stabilized cellulose propionate is molded into discs at a temperature of 200° C. for 15 minutes employing 15 parts by weight of dibutyl phthalate plasticizer for each 100 parts by weight of stabilized cellulose propionate, the discs obtained have a yellowness coefficient of 0.20. When the stabilized cellulose propionate is molded for 30 minutes at 200° C. without a plasticizer the discs have a viscosity loss of 30% as compared to a viscosity loss of 63% in discs molded of the same cellulose propionate which has merely been stabilized with water.

*Example III*

100 parts by weight of washed cellulose propionate containing about 62.9% by weight of combined propionic acid, 1.1% of combined acetic acid and 0.29 free hydroxyl groups per glucose residue are suspended in 1400 parts by weight of de-ionized water containing 4 parts per million alkalinity and subjected to a pressure of 70 pounds per square inch gauge for one hour by heating in an autoclave with steam. The pressure is released, the water drained off, and the cellulose propionate is then heated in the autoclave with steam for one hour at 20 pounds per square inch gauge pressure with 1300 parts by weight of a 31% by weight aqueous solution of isopropyl alcohol. At the end of the stabilization treatment, the aqueous alcohol is released through a valve at the base of the autoclave and the cellulose propionate washed neutral to bromothymol blue with de-ionized water. When the stabilized cellulose propionate is molded into discs for 15 minutes at 200° C. with 15 parts by weight of dibutyl sebacate as plasticizer for each 100 parts by weight of stabilized propionate, the discs obtained have a yellowness coefficient of 0.21. When the stabilized cellulose propionate is molded into discs for 30 minutes at 200° C. without any plasticizer, the viscosity loss in the discs is found to be 35%.

If the cellulose propionate is not stabilized but is finished in the usual manner by precipitating and washing with water and the cellulose propionate is molded into discs at 200 C. for 15 minutes with the same proportion of dibutyl sebacate as plasticizer, the molded discs obtained have a yellowness coefficient of 0.51.

*Example IV*

100 parts by weight of the washed cellulose propionate of Example III are stabilized with de-ionized water in the same manner as described in Example III. After stabilizing with water, the pressure is released, the water drained off, and the cellulose propionate is then heated in the autoclave with steam for one hour at 10 pounds per square inch gauge pressure in 1300 parts by weight of a 44% by weight aqueous solution of isopropyl alcohol. At the end of the stabilization treatment, the aqueous alcohol is released through a valve at the base of the autoclave and the cellulose propionate washed neutral to bromothymol blue with de-ionized water. When the stabilized cellulose propionate is molded into discs for 15 minutes at 200° C. with 15 parts of dibutyl sebacate as plasticizer for each 100 parts by weight of stabilized propionate, the discs obtained have a yellowness coefficient of 0.21. When the stabilized cellulose propionate is molded into discs for 30 minutes at 200° C. without any plasticizer, the viscosity loss in the discs is found to be 25%.

*Example V*

100 parts by weight of washed cellulose propionate containing about 62.9% by weight of combined propionic acid, 1.1% of combined acetic acid and 0.29 free hydroxyl groups per glucose residue are suspended in 1200 parts by weight of de-ionized water containing 4 parts per million alkalinity and subjected to a pressure of 70 pounds per square inch gauge for 1 hour by heating in an autoclave with steam. The pressure is released, the water drained off through the base of the autoclave and the cellulose propionate is then heated in the autoclave with steam for 1 hour at 15 pounds per square inch gauge with 1100 parts by weight of a 40% by weight solution of isopropyl alcohol. At the end of the stabilization treatment the aqueous alcohol is released through a valve at the base of the autoclave and the cellulose propionate washed neutral to bromothymol blue with de-ionized water. When the stabilized cellulose propionate is molded into discs for 15 minutes at 200° C. with 15 parts by weight of dibutyl sebacate as plasticizer for each 100 parts by weight of the stabilized cellulose propionate, the discs obtained have a yellowness coefficient of 0.24. When the stabilized cellulose propionate is molded into discs for 30 minutes at 200° C. without any plasticizer, the viscosity loss in the discs is found to be 30%.

*Example VI*

The cellulose propionate is subjected to a two-stage stabilization treatment as described in Example V. At the completion of the second stage of the stabilization treatment with isopropyl alcohol, the pressure in the autoclave is released from the top through a condenser. After releasing the pressure, the remainder of the isopropyl is distilled from the fibers, de-ionized water being added to the autoclave at the same rate at which the ispropyl alcohol is distilled off so as to maintain the same liquid level in the autoclave. After the isopropyl alcohol has been removed the stabilized cellulose propionate is washed neutral to bromothymol blue and dried. When the stabilized cellulose propionate is molded into discs at a temperature of 200° C. for 15 minutes employing 15 parts by weight of dibutyl sebacate as plasticizer, the yellowness coefficient of the discs obtained is 0.21. When the stabilized cellulose propionate is molded into discs for 30 minutes at 200° C. without any plasticizer, the viscosity loss in the discs is found to be 33%.

It is to be understood that the foregoing detailed description is given merely by way of illustration and that many variations may be made therein without departing from the spirit of our invention.

Having described our invention, what we desire to secure by Letters Patent is:

1. Process for the treatment of lower aliphatic acid esters of cellulose to render the same more stable, which comprises heating a lower aliphatic acid ester of cellulose in water under superatmospheric pressure, draining the water, again heating the lower aliphatic acid ester of cellulose in an aqueous solution of a lower aliphatic alcohol under superatmospheric pressure, removing the aqueous alcohol therefrom and washing the lower aliphatic acid ester of cellulose.

2. Process for the treatment of lower aliphatic acid esters of cellulose to render the same more stable, which comprises heating a lower aliphatic acid ester of cellulose in water under superatmospheric pressure, draining the water, again heating the lower aliphatic acid ester of cellulose in an aqueous solution of a lower aliphatic alcohol under superatmospheric pressure, distilling the lower aliphatic alcohol from the treated organic acid ester of cellulose while simultaneously adding water in a volume equal to the distilled alcohol, and washing the lower aliphatic acid ester of cellulose.

3. Process for the treatment of cellulose acetate to render the same more stable, which comprises heating cellulose acetate in water under superatmospheric pressure, draining the water, again heating the cellulose acetate in an aqueous solution of a lower aliphatic alcohol under superatmospheric pressure, distilling the lower aliphatic alcohol from the treated cellulose acetate while simultaneously adding water in a volume equal to the distilled alcohol, and washing the cellulose acetate.

4. Process for the treatment of cellulose propionate to render the same more stable, which comprises heating cellulose propionate in water under superatmospheric pressure, draining the water, again heating the cellulose propionate in an aqueous solution of a lower aliphatic alcohol under superatmospheric pressure, distilling the lower aliphatic alcohol from the treated cellulose propionate while simultaneously adding water in a volume equal to the distilled alcohol, and washing the cellulose propionate.

5. Process for the treatment of cellulose propionate to render the same more stable, which comprises heating cellulose propionate in water under superatmospheric pressure, draining the water, again heating the cellulose propionate in an aqueous solution of ethyl alcohol under superatmospheric pressure, distilling the ethyl alcohol from the treated cellulose propionate while simultaneously adding water in a volume equal to the distilled alcohol, and washing the cellulose propionate.

6. Process for the treatment of cellulose propionate to render the same more stable, which comprises heating cellulose propionate in water at a pressure of at least 40 pounds per square inch gauge, draining the water, again heating the cellulose propionate in an aqueous solution of ethyl alcohol at a pressure of at least 10 pounds per square inch gauge, distilling the ethyl alcohol from the treated cellulose propionate while simultaneously adding water in a volume equal to the distilled alcohol, and washing the cellulose propionate.

7. Process for the treatment of cellulose propionate to render the same more stable, which comprises heating cellulose propionate in 10 to 16 parts by weight of water on the weight of the cellulose propionate at a pressure of at least 40 pounds per square inch gauge, draining the water, again heating the cellulose propionate in 10 to 16 parts by weight of an aqueous solution containing 20 to 55% by weight of ethyl alcohol at a pressure of at least 10 pounds per square inch gauge, distilling the ethyl alcohol from the treated cellulose propionate while simultaneously adding water in a volume equal to the distilled alcohol, and washing the cellulose propionate.

8. Process for the treatment of cellulose propionate to render the same more stable, which comprises heating cellulose propionate in 10 to 16 parts by weight of water on the weight of the cellulose propionate for ½ to 2 hours at a pressure of at least 40 pounds per square inch gauge, draining the water, again heating the cellulose propionate in 10 to 16 parts by weight of an aqueous solution containing 20 to 55% by weight of ethyl alcohol for ½ to 2 hours at a pressure of at least 10 pounds per square inch gauge, distilling the ethyl alcohol from the treated cellulose propionate while simultaneously adding water in a volume equal to the distilled alcohol, and washing the cellulose propionate.

9. Process for the treatment of cellulose propionate to render the same more stable, which comprises heating cellulose propionate in water at a pressure of at least 40 pounds per square inch gauge, draining the water, again heating the cellulose propionate in an aqueous solution of isopropyl alcohol at a pressure of at least 10 pounds per square inch gauge, distilling the isopropyl alcohol from the treated cellulose propionate while simultaneously adding water in a volume equal to the distilled alcohol, and washing the cellulose propionate.

10. Process for the treatment of cellulose propionate to render the same more stable, which comprises heating cellulose propionate in 10 to 16 parts by weight of water on the weight of the cellulose propionate for ½ to 2 hours at a pressure of at least 40 pounds per square inch gauge, draining the water, again heating the cellulose propionate in 10 to 16 parts by weight of an aqueous solution containing 20 to 55% by weight of isopropyl alcohol for ½ to 2 hours at a pressure of at least 10 pounds per square inch gauge, distilling the isopropyl alcohol from the treated cellulose propionate while simultaneously adding water in a volume equal to the distilled alcohol, and washing the cellulose propionate.

MERVIN E. MARTIN.
LAURENCE G. REED.

REFERENCES CITED

The following references are of record in the file of this patent:

UNITED STATES PATENTS

| Number | Name | Date |
| --- | --- | --- |
| 1,536,334 | Farrow | May 5, 1925 |
| 2,028,761 | Dreyfus | Jan. 28, 1936 |
| 2,414,869 | Haney | Jan. 28, 1947 |
| 2,470,191 | Seymour et al. | May 17, 1949 |
| 2,490,164 | Seymour et al. | Dec. 6, 1949 |

FOREIGN PATENTS

| Number | Country | Date |
| --- | --- | --- |
| 459,820 | Great Britain | Jan. 15, 1937 |
| 516,945 | Great Britain | Jan. 16, 1940 |

OTHER REFERENCES

Ser. No. 242,290, Schuller et al. (A. P. C.), published Apr. 30, 1943